United States Patent [19]
Willis et al.

[11] Patent Number: 6,103,846
[45] Date of Patent: Aug. 15, 2000

[54] PROCESS FOR MAKING ANIONIC POLYMERIC DI-AND POLYFUNCTIONAL POLYMERS USING PROTECTED FUNCTIONAL INITIATORS

[75] Inventors: Carl Lesley Willis, Houston; Robert Charles Bening, Katy; Michael Wayne Potter, Sugar Land; Grant Wesley Haddix, Katy, all of Tex.; David Karl Schisla, Amsterdam, Netherlands; Thomas Carl Semple, Friendswood; Daniel Earl Goodwin, Katy, both of Tex.

[73] Assignee: Shell Oil Company, Houston, Tex.

[21] Appl. No.: 09/305,491

[22] Filed: May 5, 1999

Related U.S. Application Data

[60] Provisional application No. 60/085,894, May 18, 1998.
[51] Int. Cl.$^7$ ............................... C08F 36/06; C08F 4/46
[52] U.S. Cl. ...................... 526/335; 526/176; 526/177; 526/178; 526/181
[58] Field of Search .................................. 526/177, 178, 526/335, 176, 181

[56] References Cited

U.S. PATENT DOCUMENTS

| | | | |
|---|---|---|---|
| 3,631,006 | 12/1971 | Hawkins | 526/178 X |
| 5,331,058 | 7/1994 | Shepherd et al. | 525/332.3 |
| 5,376,745 | 12/1994 | Handlin, Jr. et al. | 526/178 |
| 5,416,168 | 5/1995 | Willis et al. | 525/333.2 |

*Primary Examiner*—Fred Teskin
*Attorney, Agent, or Firm*—Donald F. Haas

[57] ABSTRACT

The preparation of di- or polyfunctional polymers by anionic polymerization using functionalized initiators having the structure $R^1R^2R^3Si$—A—B, wherein each R is methyl and A is a hydrocarbon bridging group containing from 1 to 25 carbon atoms, and B is an alkali metal, is improved when polymerization occurs in the presence of a polymerization termination inhibitor which is a metal alkyl which has been added at a concentration to afford a molar ratio of the termination inhibitor to living polymer chain ends of about 0.1:1 to about 10:1.

19 Claims, No Drawings

PROCESS FOR MAKING ANIONIC POLYMERIC DI-AND POLYFUNCTIONAL POLYMERS USING PROTECTED FUNCTIONAL INITIATORS

This application claims the benefit of U.S. provisional application Ser. No. 60/085,894, filed May 18, 1998, the entire disclosure of which is hereby incorporated by reference.

FIELD OF THE INVENTION

This invention relates to anionic polymerization of unsaturated monomers to make functionalized polymers useful in adhesives, sealants and coatings. In particular, this invention relates to a process to make diol and polyol polymers using a protected functional initiator and the diol polymers resulting therefrom.

BACKGROUND OF THE INVENTION

Anionic polymerization of unsaturated monomers with lithium initiators, such as sec-butyllithium, and hydrogenation of residual unsaturation has been described in many references. Great Britain published patent application 2,241, 239 and related U.S. Pat. Nos. 5,331,058 and 5,362,699 describe a composition for an anionic protected functional initiator (PFI) having the structure

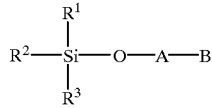

(1)

wherein $R^1$, $R^2$, and $R^3$ are independently selected from saturated and unsaturated aliphatic and aromatic radicals, A is a hydrocarbon bridging group containing from 1 to 25 carbon atoms and B is an alkali metal, such as lithium. These documents disclose that a problem with undesirable termination reactions can occur when using the PFI, particularly if the radicals, $R^1$, $R^2$, and $R^3$ are all methyl or if together they contain less than 4 carbon atoms.

U.S. Pat. No. 5,416,168 describes a polymerization process using lithium compounds having the structure:

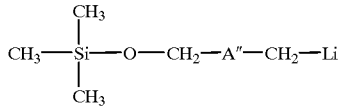

(4)

wherein A" is cyclohexyl or —CR'R"—, wherein R' is a linear alkyl having from 1 to 10 carbon atoms, and R" is hydrogen or a linear alkyl having from 1 to 10 carbon atoms. This PFI also initiates polymerization of anionic polymers at much higher polymerization temperatures than previously known for PFIs and is cost effective to produce.

Unfortunately, even for the cost effective PFI of '168, it has been found that in commercial applications where polymerization cycle times of two hours or longer are possible, these initiators undergo undesirable termination reactions. The results of these undesirable termination reactions are varied and include (a) limiting the amount of polymer that can be produced from a given amount of initiator, (b) broadening the molecular weight distribution of the polymer, (c) limiting the ability to make well defined block copolymers, and/or (d) limiting the ability for post-polymerization chemistry, such as adding another functional site to the living end of the polymer chain. Therefore it would be highly desirable to develop a process which inhibits undesirable side reactions, resulting in a higher functionality in the polymer product.

SUMMARY OF THE INVENTION

The present invention provides an improved process for making di- or poly-functional polymers using polymerization initiators having the structure:

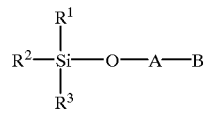

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal. One or more anionically polymerizable monomers especially conjugated dienes, are polymerized in the presence of a polymerization termination inhibitor that is a metal alkyl. Preferably, the metal alkyl is selected from the group consisting of trialkyl aluminum, dialkyl magnesium, and dialkyl zinc compounds.

In another embodiment of the invention, there is provided a functionalized polymer produced when 1,3-butadiene is polymerized using a initiator having the structure

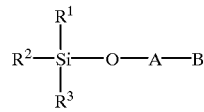

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal. The butadiene is polymerized in the presence of the polymerization termination inhibitor described above.

DETAILED DESCRIPTION OF THE INVENTION

This invention relates to functionalized polymers and processes for inhibiting polymerization terminating side reactions that can occur when protected functional initiators are used. Polymers which can be made according the present invention are those made from any anionically polymerizable monomer, especially including terminal functionalized polydiene polymers, including random and block copolymers with styrene. Styrene copolymers hereunder can be made in the same manner as the polydiene polymers and can be random or block copolymers with dienes.

In general, the present invention will work to reduce or eliminate side reactions when anionically polymerizing conjugated dienes or other anionically polymerizable monomers using any protected functional initiator having a reactive silicon center. Several PFIs have been described in the art. For example, the production and use of PFIs having the structure

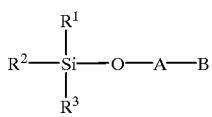

(1)

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal, preferably lithium, is described in Great Britain patent application 2,241,239 and U.S. Pat. Nos. 5,331,058 and 5,362,699, which are incorporated herein by reference. U.S. Pat. No. 5,321,148, which description is incorporated by reference herein, describes the above PFI as having $R^1$, $R^2$, and $R^3$ independently selected from alkyl groups containing 1 to 10 carbon atoms and aryl groups containing 6 to 10 carbon atoms, A selected from alkyl groups containing 2 to 8 carbon atoms either straight chain or substituted by alkyl or aryl groups, and B as lithium.

In a preferred embodiment, $R^1$, $R^2$ and $R^3$ are each methyl; the hydrocarbon bridging group has the structure $CH_2$—A"—$CH_2$, wherein A" is cyclohexyl or —CR'R"—, R' is a linear alkyl having from 1 to 10 carbon atoms and R" is hydrogen or a linear alkyl having from 1 to 10 carbon atoms; and B is lithium, resulting in the structure

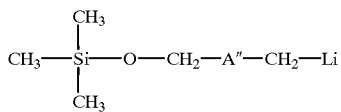

(2)

This is described in U.S. Pat. No. 5,416,168, which description is incorporated herein by reference. The initiator of structure (2) has been used to prepare polymers of butadiene which have a uniform distribution of 1,2-addition when the amount of 1,2-addition is between 5 and 95% w, more preferably between 30 to 70% w.

The alkali metal initiator process is well known. U.S. Pat. Nos. 4,039,593 and Re. 27,145, which descriptions are incorporated herein by reference, describe the process for lithium initiators. Typical living polymer structures that can be made with alkali metal initiators:

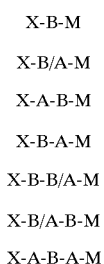

wherein B represents polymerized units of one or more anionically polymerizable monomers, especially conjugated diene hydrocarbons, A represents polymerized units of one or more vinyl aromatic compounds, B/A represents random polymerized units of the conjugated diene hydrocarbons and the vinyl aromatic monomers, M is an alkali metal, and X is the residue of the initiator. The living polymers are terminated as linear polymers, coupled to form branched polymers, or capped to form additional functional groups by conventional means such as addition of methanol, silicon tetrachloride, divinylbenzene, or ethylene oxide.

Unfortunately, the PFI initiators undergo undesirable termination, or "side" reactions. Great Britain patent application 2,241,239 warned of reactivity of the siloxy group and suggested that the radicals $R^1$, $R^2$, and $R^3$ not all be methyl, and preferably that one be aryl, and that the total carbon atoms in the radicals be at least 4, preferably 5. It has now been discovered that the adverse side reactions involve a reaction of the living, C—M end of the anionic polymer chain with the protected, $R^1R^2R^3SiOC$, end. This side reaction, which appears to occur a little over 10% of the time, results in the transfer of the alkali metal moiety from the growing end of the polymer chain to the inactive, protected functional group end of the molecule. For example, when a PFI of Structure (2) is used, in some of the molecules the desired structure of the living polymerization product

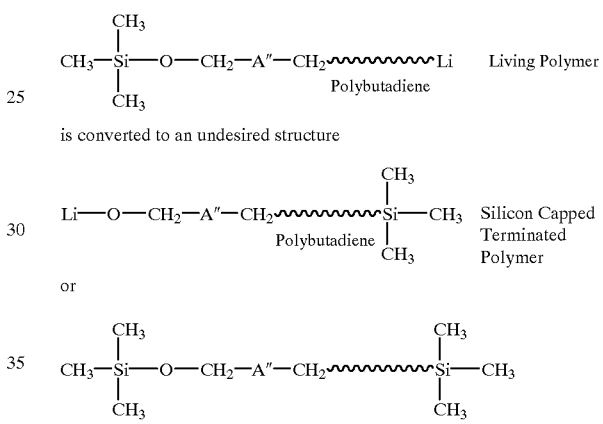

In the undesired structures, the living polymer C—Li end's reactivity is terminated, making the molecule inert to (a) further polymerization and (b) postpolymerization reactions, such as capping with ethylene oxide. Loss of activity in further polymerization affects the cost effectiveness of the initiator, limits the initiator's effectiveness in making block copolymers, and tends to broaden the molecular weight distribution of the product. Loss of postpolymerization reaction capability means that desired reactions, such as reacting the polymer chain with ethylene oxide to make a difunctional telechelic polymer or reacting with a coupling agent to make a linked polymer having functional groups on the ends of the molecules, become limited. Thus the polymer mixture becomes one containing monofunctional impurity, a structural phenomenon of great commercial disadvantage compared to difunctional polymers.

The process of the present invention employs termination inhibitors that inhibit the alkali metal-silicon attack. This inhibition of termination seems to occur as a result of the living polymer chain end reacting reversibly with the metal alkyl inhibitor to form an "ate complex." An illustrative example of this concept is shown below for the case where triethylaluminum is the metal alkyl inhibitor and butadiene is the anionically polymerizable monomer. The "ate complex" appears to be less reactive with the Si—O bond on the protected end of the polymer chain. This may, at least in part, be due to the increased steric bulk of the "ate complex."

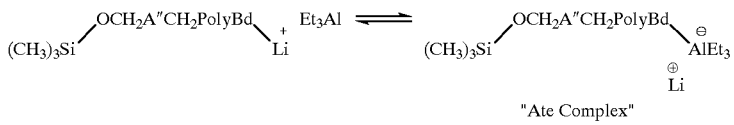

"Ate Complex"

The C—Li center on an uninhibited, living chain end is smaller and therefore more prone to the undesired side reaction with the Si—O bond of a protected polymer chain end than is the large, bulky end of an "ate complex." It is likely the case that the maximum level of inhibition is achieved when the inhibitor is present in a concentration equal to that of living polymer chain ends (Metal Alkyl/C—Li Center=1(mol/mol)). For the purpose of controlling other aspects of the polymerization reaction, such as the polymerization rate, it may be desirable to use less of the inhibitor. The lower limit on an effective amount of the inhibitor would best be determined by experiment. It is unlikely that levels below one inhibitor per 10 C—Li chain ends (Metal Alkyl/C—Li Center>0. 1) give a measurable level of inhibition of the side reaction with the Si—O centers. Levels of inhibitor that are in molar excess of the living polymer chain ends, C—Li centers, are expected to be effective inhibitors of the undesired side reaction but will not be markedly better than a molar ratio of 1:1. As excess levels of inhibitor are not expected to improve performance, they will add unnecessarily to the cost of the process. For this reason, lower levels of the inhibitor reagent are preferred. The inhibitor is used in molar ratios relative to the living polymer chain ends of from 0.1 to 10, more preferably from 0.1 to 1, most preferably from 0.5 to 1.

The inhibitor selected should be a metal alkyl. Preferably, the metal alkyl is selected from the group consisting of trialkyl aluminum, dialkyl magnesium, trialkyl boron and dialkyl zinc compounds. Preferred trialkylaluminum compounds are triethylaluminum, trimethylaluminum, tri-n-propylaluminum, tri-n-butylaluminum, triisobutylaluminum, tri-n-hexylaluminum, and trioctylaluminum because these reagents are readily available in commercial quantities. Triethylaluminum is most preferred as it is least expensive on a molar basis. Preferred dialkylmagnesium compounds are butylethylmagnesium, di-n-butylmagnesium, and di-n-hexylmagnesium because these reagents are readily available in commercial quantitites. Preferred dialkyzinc compounds are dimethylzinc, diethylzinc, di-n-propylzinc, diisobutylzinc, and di-n-butylzinc because these reagents are readily available in commercial quantities.

A polymerization process using these termination inhibitors undergoes less of the undesired termination reactions than analogous polymerization processes that do not use the polymerization termination inhibitors. The polymerization process is thus more efficient because a greater number of polymerization sites remain active throughout the polymerization. The polymer produced also has a narrower molecular weight distribution and a higher degree of di- or polyfunctionality from the improved reactivity in end capping or coupling reactions.

Great Britain patent application 2,241,239 suggested that, in order to reduce reactivity of the siloxy group, polymerization temperature be controlled between −30° C. and +30° C. Unfortunately, for commercial applications such polymerization temperatures are cost prohibitive, as the reagents must be cooled for such an exothermic reaction. Also, the polymerization time at the lower temperatures is much longer than is commercially feasible. PFIs are very active at room temperature and it has been found that polymerization is preferably initiated at a temperature from 15° C. to 60° C., most preferably from 30° C. to 40° C. It is generally advisable to keep the polymerization temperature below about 100° C. or side reactions that change microstructure and limit capping efficiency may become important. Polymerizations can be carried out over a range of solids levels, preferably from about 5% w to about 80% w polymer, most preferably from about 10% w to about 40% w.

When the conjugated diene is 1,3-butadiene and when the conjugated diene polymer will be hydrogenated, the anionic polymerization of the conjugated diene hydrocarbons is typically controlled with high concentrations of structure modifiers such as diethyl ether to obtain the desired amount of 1,2-addition. As described in Re 27,145 which is incorporated by reference herein, the level of 1,2-addition of a butadiene polymer or copolymer can greatly affect the clarity, rheology, and elastomeric properties of the polymer after hydrogenation. It is desired that the modifier result in a polybutadiene with about 40% to 70% vinyl content. To accomplish this it is typical to use a diethyl ether: chain end ratio of greater than 1:1 mol/mol.

Polymerization may take place using the typical batch process. Certain advantages have been found, however, when a continuously stirred tank reactor or other continuous flow reactor, such as a plug flow or multiple stage flow reactor, is used, particularly if the conjugated diene is butadiene. As mentioned previously, a preferred temperature for polymerization is from 30° C. to 40° C. In a batch/semi-batch process, the PFIs are slow to initiate in this temperature range and may never completely initiate. Also, heat released by the exothermic polymerization reaction becomes concentrated into certain regions of the batch cycle, making temperature control difficult. The use of a continuous flow reactor, such as a continuously stirred tank reactor, helps to reduce the impact of these problems. Residence time may be substantially reduced (85% to 90% reduction), further reducing the incidence of undesirable endcaps, without loss of PFI conversion because temperatures may be increased. The continuously stirring or flow also helps evenly distribute the heat load, reducing the required heat removal duties of the batch polymerization reactor.

Anionic polymerization is often terminated by addition of water to remove the lithium as lithium hydroxide (LiOH) or by addition of an alcohol (ROH) to remove the lithium as a lithium alkoxide (LiOR). Polymers prepared from initiators of the present invention and terminated in this way will be mono-hydroxyl functional materials (mono-ols) after removal of the trimethylsilyl ether-protecting group. To prepare polymers having an additional hydroxyl terminal functional groups, the living polymer chains are preferably terminated by addition of ethylene oxide, oxetane, or 2,2-dimethyloxetane. To prepare polymers having an additional terminal functional group that is carboxyl, the living polymer chains are preferably terminated by addition of carbon dioxide. To prepare polymers having an additional terminal functional group that is phenolic, the living polymer chains are preferably terminated by addition of a protected hydroxystyrene monomer. To prepare polymers having an additional terminal functional group that is epoxy, the living polymer chains are preferably terminated by addition of ethylene oxide to make the lithium alkoxide (OLi) chain end which is then reacted with epichlorohydrin to make the glycidol ether epoxide. To prepare polymers having an additional terminal functional group that is an amine, the living polymer chains are preferably terminated by addition of an aziridine reagent such as that listed in U.S. Pat. No. 4,791,174 which is herein incorporated by reference.

The most preferred process polymerizes 1,3-butadiene at 5% to 30% solids using an initiator having the following structure:

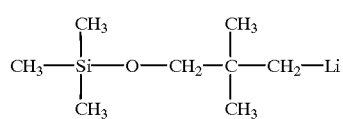
(5)

(3-lithio-2,2-dimethyl-1-trimethylsilyloxypropane). The 1,3-butadiene is added either in batch or by programmed addition of monomer, depending upon the cooling capability of the reactor. Polymerization occurs in the presence of triethylaluminum, a polymerization termination inhibitor which is added such that the molar ratio of triethylaluminum to living polymer chain ends is from 0.1 to 10, preferably 0.1 to 1, more preferably from 0.5 to 1. The polymerization reaction time is sufficient to achieve at least 80% conversion of the conjugated diene monomer to polybutadiene. More preferably 90% conversion is achieved. Most preferable is conversion in excess of 95%.

After polymerization of the desired amount of 1,3-butadiene, the living polymer is capped with ethylene oxide and reacted with methanol to give a terminal primary alcohol functional group on one end of the polymer chain. The protected functional initiator on the other end of the polymer chain is then deprotected. For example, the silyl ether group on the other end of the chain is then converted to a primary, neopentyl-type hydroxyl group by reaction with aqueous acid or aqueous base affording a telechelic dihydroxy polymer product.

Hydrogenation of at least 90%, preferably at least 95%, of the unsaturation in low molecular weight butadiene polymers is achieved with nickel catalyst as described in U.S. Pat. Nos. 27,145, 4,970,254, and 5,166,277 which are incorporated by reference herein.

After polymerization and, optionally, hydrogenation and washing of the polymer, the trimethylsilyl ether group at the front of the polymer chain is removed to generate the desired primary, neopentyl-type hydroxyl functional group. This step is often referred to as deprotection. A variety of processes for removal of the silyl protecting group are known; for a review, see T. W. Greene, "Protective Groups in Organic Synthesis", J. Wiley and Sons, New York, 1981. Deprotection preferably involves easily handled, relatively low toxicity, inexpensive reagents and mild, low cost process conditions. In a preferred process, the trimethylsilyl ether group is removed after hydrogenation and during the aqueous acid wash for removal of the spent Ni/Al hydrogenation catalyst. This technique avoids the cost associated with a separate process step for deprotection. For the preparation of an unsaturated polymer where hydrogenation catalyst extraction is not required, contacting the polymer cement with a dilute aqueous acid or dilute aqueous base solution is preferred for deprotection.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. TUFFLO® 6056 and 6204 oil made by Arco and process oils, e.g. SHELLFLEX® 371 oil made by Shell. The amounts of rubber compounding oil employed in the invention composition can vary from 0 to about 500 phr, preferably between about 0 to about 100 phr, and most preferably between about 0 and about 60 phr. Phr means "parts per hundred rubber" which is parts by weight per 100 parts by weight of polymer wherein the polymer is referred to as the "rubber".

Optional components of the present invention are stabilizers that inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

The dihydroxylated conjugated diene polymers of the present invention may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including polyacetones, polyalkylene arylates, including polyalkylene terephthalates, having a structure formed by polycondensation of a dicarboxylic acid with a glycol. The blends may be made in the reactor or in a post compounding step.

The conjugated diene polymers produced as described herein have the conventional utilities for terminally functionalized polymers such as forming adhesives, coatings, and sealants. Additionally, the polymers may be used to modify polyurethanes, polyesters, polyamides, polycarbonates, and epoxy resins. The preferred polymers of the present invention are useful in adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.).

The present invention is further described by the following examples. The examples are not intended to limit the present invention to specific embodiments.

EXAMPLES

EXAMPLE 1

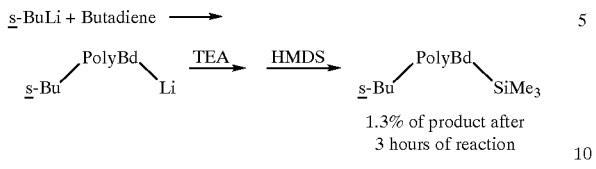

1.3% of product after 3 hours of reaction

In a stainless steel autoclave, sec-butyllithium (s-BuLi) (67g of a 12% solution in cyclohexane, 0.125 mol) was reacted with 1,3-butadiene (Bd) (400g, 7.4 mol) to make a living mono-initiated polymer. Polymerization was in a cyclohexane/diethyl ether mixture (90/10 (wt/wt)). At full conversion, the mixture contained about 20% wt of a living polybutadiene. After polymerization, $Et_3Al$ (TEA) (87 g of a 1M solution in hexane, 0.125 mol) was added to make TEA:C—Li=1:1 (mol:mol). The purpose of the added TEA was to inhibit the rate of addition of the chain ends to the added Si—O moiety. Hexamethyldisiloxane (HMDS)(20.2 g, 0.125 mol) was added as a model for the chain end of a Protected Functional Initiator (PFI) reagent. Reaction proceeded for 3 hours at 57° C. Aliquots were taken over the course of the reaction, quenched, and analyzed by H—NMR with the following results:

| Time | % Chain Ends With $Me_3Si$ Cap (mol %) |
|---|---|
| 0 | 1.7 |
| 5 | 1.7 |
| 15 | 1.8 |
| 20 | 1.8 |
| 30 | 1.8 |
| 60 | 2.2 |
| 120 | 2.5 |
| 180 | 3.0 |

The undesired side reaction, capping the living polymer chain end with the added silicon reaction, was slow in the presence of the termination inhibitor, TEA. The capping level increased by only 1.3% over the course of 3 hours at 57° C. The sample taken at 0 time (before the addition of the HMDS reagent) had Si caps already which was due to contamination in the reactor.

COMPARATIVE EXAMPLE 1

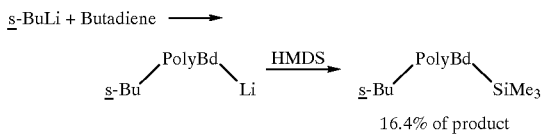

16.4% of product

This experiment was conducted in the same manner as Example 1 with the exception that no TEA was added to inhibit the Si capping reaction. The living polymer concentration was the same (20% wt polymer) and the living polymer chain end concentration was the same. The solvent mixture was the same (cyclohexane/diethyl ether (90/10 (wt/wt)). The living polymer was treated with HMDS at a level such that the HMDS:C—Li=1:1. This is the same as had been used in Example 1. Reaction with HMDS was at 53–58° C. The important difference between this experiment and that outline in Experiment 1 was that no TEA was added before the HMDS reagent was added. After 2 hours of reaction, 16.4% of the chain ends had $Me_3Si$ caps. This indicates that there had been a high level of reaction with HMDS, the undesired side reaction.

EXAMPLE 2

$Me_3SiORLi$ + Butadiene ⟶

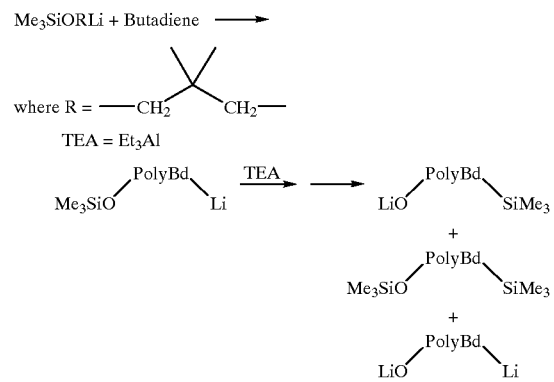

where R = —CH₂ CH₂—

TEA = $Et_3Al$

A polymer was prepared using 3-lithio-2,2-dimethyl-1-trimethylsiloxypropane (85 g of 12.2% (wt) solution in cyclohexane, 0.0625 mol), and 1,3-butadiene (200g, 3.7 mol). Polymerization in a cyclohexane/diethyl ether mixture (90/10 (wt/wt)) at about 30° C. gave about 10%wt polymer at complete conversion. After 12 min of polymerization, about 1 half-life, TEA (43.2g of a 1M solution in hexane, 0.062 mol) (TEA:C—Li=1 (mol:mol)) was added to inhibit the reaction of the living polymer chain end with the $Me_3SiO$-end of the polymer chain. Aliquots were taken at timed intervals after the addition of TEA, quenched, and analyzed by H—NMR with the following results:

| Time | % Chain Ends With $Me_3Si$ Cap (mol %) |
|---|---|
| 0 | 2.0 |
| 13 | 3.0 |
| 27 | 3.0 |
| 37 | 3.0 |
| 74 | 5.0 |
| 98 | 6.0 |
| 125 | 5.0 |

After reacting for over 2 hours at 30° C. in the presence of TEA, the Si capping level had increased by only about 3 to 4 mol %.

COMPARATIVE EXAMPLE 2

$Me_3SiORLi$ + Butadiene ⟶

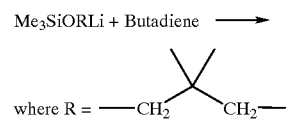

where R = —CH₂ CH₂—

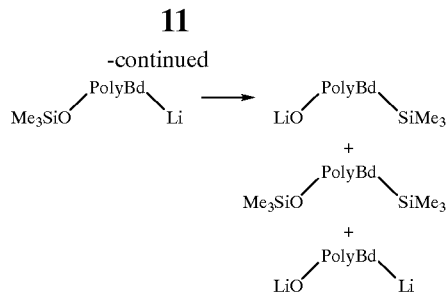

An experiment was conducted at the same conditions as Example 2 with the exception that none of the Si capping inhibitor reagent, TEA, was added. After two hours of reaction at a temperature of about 30° C., the Me₃Si capping level was 14%. This is much higher than had been observed in the presence of the inhibitor, TEA.

COMPARATIVE EXAMPLE 3

An experiment was conducted at the same conditions as Example 2 with the exception that none of the Si capping inhibitor reagent, TEA, was added. After two hours of reaction, the Me₃Si capping level was 15.7%. This is much higher than had been observed in the presence of the inhibitor, TEA.

We claim:

1. A process for making functionalized polymers, comprising the steps of:
   (a) initiating polymerization of one or more anionically polymerizable monomers with an initiator having the structure $$R^2-\underset{\underset{R^3}{|}}{\overset{\overset{R^1}{|}}{Si}}-O-A-B$$

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal;
   (b) polymerizing one or more anionically polymerizable monomers in the presence of a polymerization termination inhibitor which is a metal alkyl; and
   (c) recovering a linear or branched polymer having one or more terminal functional groups.

2. The process of claim 1 wherein the polymerization termination inhibitor is present in a concentration such that the molar ratio of the inhibitor to the living polymer chain ends is from 0.1 to 10.

3. The process of claim 2 wherein the ratio is 0.1 to 1.0.

4. The process of claim 1 wherein the polymerization termination inhibitor is selected from the group consisting of trialkyl aluminum, dialkyl magnesium, dialkyl zinc compounds, and combinations thereof.

5. The process of claim 4, wherein the polymerization termination inhibitor is selected from the group consisting of triethylaluminum, trimethylaluminum, diethylzinc, and ethylbutylmagnesium.

6. The process of claim 5 wherein the polymerization termination inhibitor is triethylaluminum.

7. The process of claim 1 wherein the monomer is 1,3-butadiene.

8. The process of claim 1, wherein the alkali metal is lithium or sodium.

9. A functionalized polymer produced by a process comprising the steps of:
   (a) initiating polymerization of 1,3-butadiene with an initiator having the structure $$R^2-\underset{\underset{R^3}{|}}{\overset{\overset{R^1}{|}}{Si}}-O-A-B$$

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal;
   (b) polymerizing 1,3-butadiene in the presence of a polymerization termination inhibitor which is a metal alkyl, wherein the molar ratio of the inhibitor to the living polymer chain ends is from 0. 1 to 1.0; and
   (c) recovering a linear or branched polymer having one or more terminal functional groups.

10. The polymer of claim 9 wherein the molar ratio of the inhibitor to the living polymer chain ends is from 0.5 to 1.0.

11. The polymer of claim 10 wherein the ratio is 0.5.

12. The polymer of claim 9 wherein the polymerization termination inhibitor is selected from the group consisting of trialkyl aluminum, dialkyl magnesium, dialkyl zinc compounds, and combinations thereof.

13. The polymer of claim 12 wherein the polymerization termination inhibitor is selected from the group consisting of triethylaluminum, trimethylaluminum, diethylzinc, and ethylbutylmagnesium.

14. The polymer of claim 13 wherein the inhibitor is triethylaluminum.

15. The reaction product of step (b) of claim 1.

16. The reaction product of claim 15 wherein the monomer is 1,3-butadiene.

17. The reaction product of claim 16 wherein the metal alkyl is triethylaluminum.

18. The process of claim 9, wherein the alkali metal is lithium or sodium.

19. The reaction product of claim 9, wherein the metal alkyl is triethylaluminum.

* * * * *